United States Patent [19]

Albright

[11] Patent Number: 4,901,357

[45] Date of Patent: Feb. 13, 1990

[54] ELECTROMAGNETIC TRANSDUCER

[76] Inventor: Eugene A. Albright, 1742 W. Rose, Phoenix, Ariz. 85015

[21] Appl. No.: 6,619

[22] Filed: Jan. 20, 1987

[51] Int. Cl.$^4$ ............................................... H04R 5/02
[52] U.S. Cl. .................................... 381/192; 381/199; 381/202; 381/203
[58] Field of Search ............... 381/192, 194, 196, 199, 381/201, 202, 203; 335/213, 220, 221, 302, 303, 306

[56] References Cited

U.S. PATENT DOCUMENTS

| 3,141,071 | 7/1964 | Rich | 381/196 |
| 4,013,846 | 3/1977 | Krawczak et al. | 381/203 |
| 4,237,347 | 12/1980 | Burundukov et al. | 381/192 |
| 4,613,843 | 9/1986 | Esper et al. | 324/208 |
| 4,727,586 | 2/1988 | Johnson | 381/195 |

Primary Examiner—Ulysses Weldon
Assistant Examiner—Tyrone Queen
Attorney, Agent, or Firm—LaValle D. Ptak

[57] ABSTRACT

An electromagnetic transducer utilizes flat permanently magnetized plates made of magnetically hard ceramic materials having thicknesses substantially less than the dimensions across the faces thereof. Electric signals may be applied through a coil adjacent one of the faces to cause a changing flux on the opposite face. This changing flux then may be utilized to produce electric outputs in an output coil or to drive a resiliently mounted magnet or shorted turn speaker coil. Conversely, changes may be induced in magnetic flux through the plate which are picked up by a coil on the other side of the plate and converted to electric signals which in turn may be applied to a suitable utilization device.

12 Claims, 3 Drawing Sheets

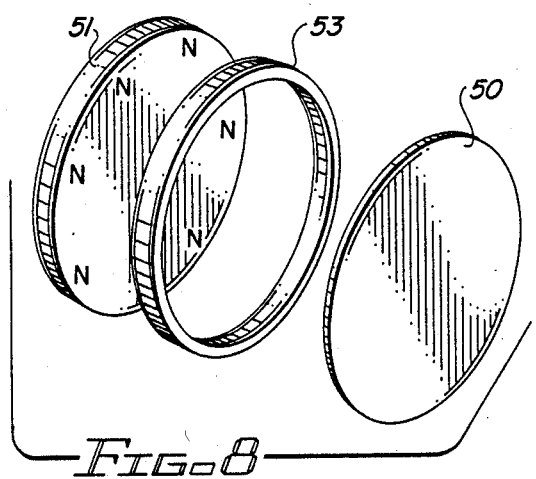
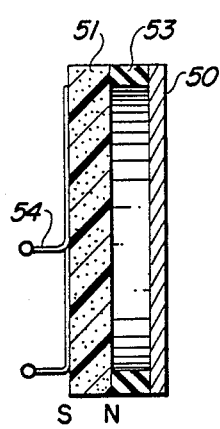
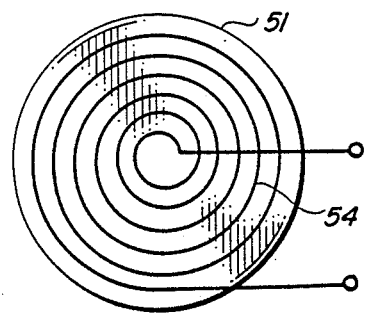
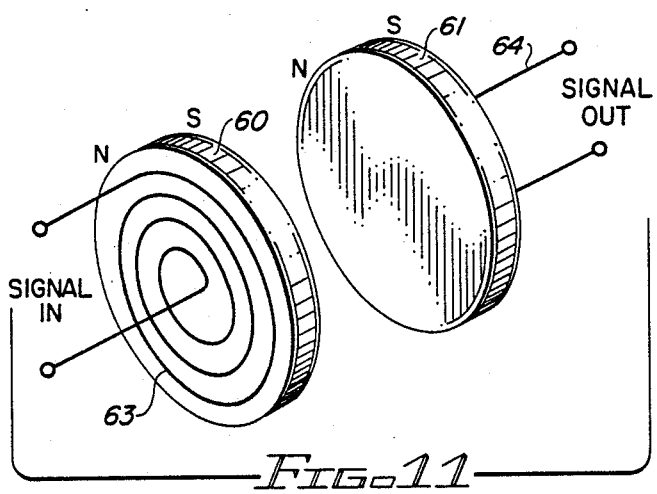
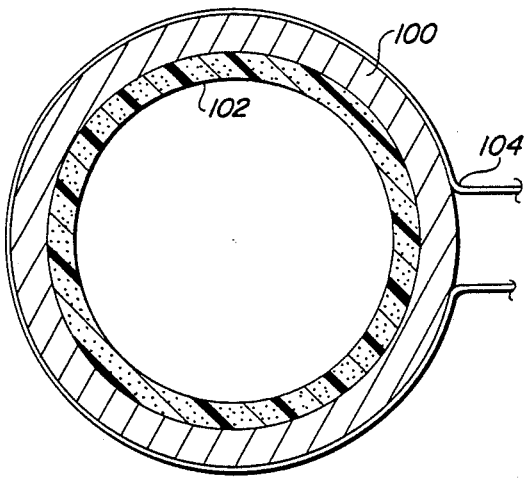
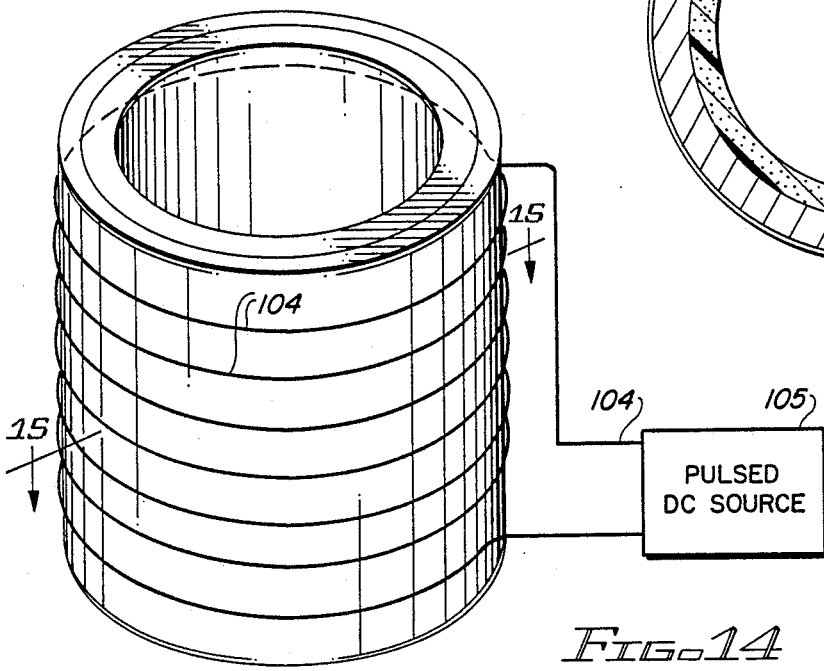

ELECTROMAGNETIC TRANSDUCER

BACKGROUND

Electromagnetic transducers have been used in magnetostatic structures in a wide range of applications, such as loudspeakers, microphones, generators, electric guitar pick-ups and the like. The generation of a voltage in a conductor by the changing of the magnetic flux of a magnetostatic structure or the movement of magnetic flux of a magnetostatic structure relative to the conductor is an old concept. These devices in the prior art commonly use a permanent magnet made of electrically conducting metal. Since magnets made of electrically conducting metals rapidly attenuate any electromagnetic energy, as do any electrical conductors, the use of such metal permanent magnets has been primarily limited to core elements inside electrically insulated conductor coils or applications as permanent magnets surrounding a floating speaker coil or similar applications.

With the advent of ceramic magnetic materials, magnets which are not electrical conductors have become available. Ceramic magnets are available in both permanent (hard) magnetic materials or magnetically soft materials of high permeability. Various types of ceramic magnetic compositions of both the hard and soft types use "ferrite" materials. Generally, these materials are magnetically soft materials (that is, non-permanent magnetics.) "Hard" or permanent magnetic materials are high loss, high retentivity, high coercivity materials with low permeability.

The coercive force of hard magnetic materials is on the order of tens of thousands of times greater than that of the lowest coercive force of soft magnetic materials. From a magnetic softness viewpoint, the important thing to regard is the hysteresis loop. For soft magnetic materials, the area of the hysteresis loop is quite small, whereas for "hard" magnetic materials, the area of the hysteresis loop is large by comparison with soft magnetic materials. The bulk of the work in electric circuit design using magnetic materials involves the application of magnetically soft cores in inductors and transformers and the like. These uses encompass a large range of ferrite and metal cores, and the applications of permanent magnets (metal or ceramic) in electronic circuit design has been nearly neglected.

In the Eugene A. Albright U.S. Pat. No. 4,429,314, the use of permanently magnetized, magnetically hard dielectric materials to obtain significantly improved operating characteristics in transmitting and receiving antennae is disclosed. In this patent, elongated electrical conductors are embedded in or encased in permanently magnetized magnetically hard dielectric materials to form antennae. The magnets include various ratios of ferrite powder, such as barium ferrite or cobalt ferrite in a suitable epoxy or thermal setting resin. The ferrites are suspended in the resin and then are permanently magnetized. The ratio of the barium or cobalt powder to the resin is disclosed as varying from a ratio of approximately 20% of the ferrite powder by weight to 90%. As disclosed in this patent, the preferred ferrites are isotropic or anisotropic barium ferrites, such as Ferroxdure and the like.

Even though "hard" magnetic materials are known, such materials have not been used in electromagnetic transducers such as microphones, guitar pick-ups, speakers and the like. Such devices generally employ "soft" magnetic material or permanent magnets made of electrically conducting metal. As stated previously, the conductivity of such metal permanent magnetics rapidly attenuates electromagnetic energy; so that metal permanent magnets cannot be used in many electromagnetic transducer applications.

It is desirable to create electromagnetic transducers utilizing magnets made of "hard" magnetic material which provide enhanced operating characteristics to the electromagnetic devices in which they are used and which take advantage of the amplification characteristics of "hard" ceramic magnetic materials.

SUMMARY OF THE INVENTION

Accordingly, it is an object of this invention to provide an improved electromagnetic transducer.

It is another object of this invention to provide an improved electrical circuit component.

It is an additional object of this invention to provide an improved electromagnetic transducer utilizing a relatively thin, permanently magnetized, flat ceramic plate with a conductive coil placed adjacent to at least one of the faces of the plate for inducing changes in the flux at the other face of the plate in response to electric signals applied through the coil or inducing current in the coil in response to changes in the flux on such other face of the plate.

In accordance with a preferred embodiment of this invention, an electromagnetic transducer includes a flat ceramic magnetic plate of permanently magnetized material, with the plate having a thickness which is substantially less than the dimensions across its face. The plate is magnetized through the thickness to form a North Pole on one face and a South Pole on the other. A coil of electric conductive material is placed adjacent one face of the plate for inducing changes in the magnetic field adjacent the other face of the plate which are proportional to current through the coil and vice-versa.

BRIEF DESCRIPTION OF THE DRAWINGS

FIG. 8 is an exploded view of another embodiment of the invention;

FIG. 9 is a cross-sectional side view of the embodiment shown in FIG. 8;

FIG. 10 is a rear view of the embodiment shown in FIGS. 8 and 9;

FIG. 11 is a perspective view of another embodiment of the invention;

FIGS. 14 and 15 are a perspective and cross-sectional view of yet another embodiment of the invention.

DETAILED DESCRIPTION

Figure 1:
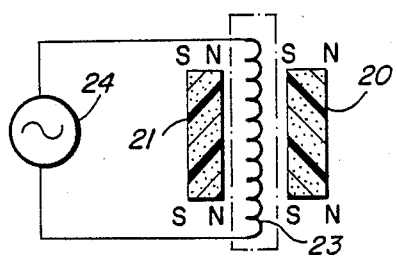
FIG. 1 is a diagrammatic view of a preferred embodiment of the invention.
Figure 4:
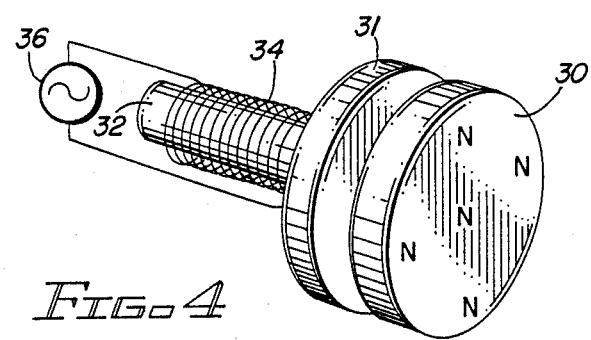
FIG. 4 is a perspective view of another embodiment of the invention.

Reference now should be made to the drawings in which the same reference numbers are used throughout the different figures to designate the same or similar components. Referring now to the embodiments of FIGS. 1 and 2, a pair of flat, ceramic hard magnetic permanent magnet plates 20 and 21 are placed on opposite sides of a coil 23 which is supplied with signals from a suitable alternating current source 24, which may be an audio amplifier or the like. The width and height of the plates 20 and 21 are considerably greater than the thickness of the plates. For example, each of the plates 20 and 21 may be 4" long by 3" wide by ¼" thick. Each of the plates also is permanently magnetized through the thickness thereof to form one large face North Pole (the right side as viewed in FIGS. 1 and 2) and one large face South Pole (the left face as viewed in FIGS. 1 and 2).

The plates 20 and 21 preferrably are made of a magnetically "hard" ceramic ferrite such as isotropic or anisotropic barium ferrites ($BaFe_{12}O_{19}$), such as Ferroxdure. The plates 20 and 21 also may be made of a uniform colloidal suspension of such ferrite particles in a liquid dielectric potting compound such as a resin binder (epoxy or thermosetting) in which the amount of ferrite may be varied from an amount approximately 5% by weight of the mixture to 90% by weight of the mixture, depending upon the characteristics desired in the final transducer which is produced. Although the coil 23 shown in FIGS. 1 and 2 is illustrated as a helical coil, it also may be a flat spiral coil, the plane of which is parallel to the plane of the faces of the plates 20 and 21.

An alternating current signal applied through the coil 23 interacts with the magnetic energy between the plates 20 and 21 because it produces changes in flux in the coil 23 which is in the connecting field of the magnets and between them. It has been found that this variation in flux caused by the changes in flux through the coil 23 applied to the inside faces of the magnet plates 20 and 21 causes corresponding proportional amplified variations in the magnetic fields adjacent the external faces of the plates 20 and 21. For example, an alternating current signal applied to the coil 23 which produces 100 gauss variations in magnetic flux around the coil 23 results in output variations of 200 gauss on the exterior pole faces of the plates 20 and 21, for example the North Pole face on the right hand side of the plate 20 of FIGS. 1 and 2. Typically, the plates 20 and 21 carry a permanent magnetization of 2000 gauss; so that the output variation in the magnetic field detected on the right-hand face of the plate 20 (and correspondingly on the left-hand face of the plate 21) varies from 2100 gauss to 1900 gauss. For the right-hand plate 20, as illustrated in FIGS. 1 and 2, this constitutes an alternating or pulsing North Pole field which varies from its maximum to its minimum over a range of 200 gauss.

Larger coils 23 and higher currents can produce pulsed or alternating magnetic fields of a single polarity of significantly higher magnetic amplification. For example, if the plates 20 and 21 are permanently magnetized through the thicknesses, as illustrated, with a magnetization of 2,000 gauss and the current through the coil 23 produces a variation of 1,000 gauss (±) the resultant variation at the outer faces of the plates 20 and 21 is a 2,000 gauss variation (from a minimum of 1,000 gauss to maximum of 3,000 gauss). At each of the outer faces of the magnets 20 and 21, the magnetic flux pulsates between high and low limits (at twice the amplitude of the flux produced through the coil 23) in a magnetic duplication of the alternating current signals applied from the source 24 to the coil 23.

Figure 2:
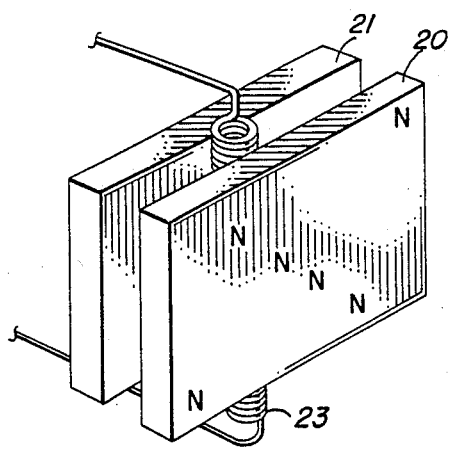
FIG. 2 is a perspective view of the embodiment of FIG. 1.
Figure 5:
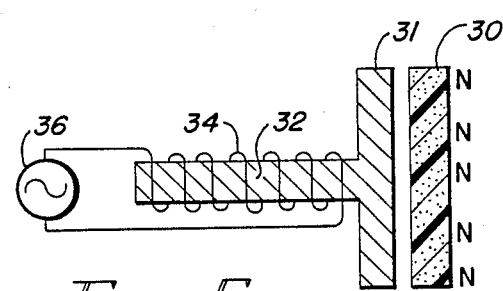
FIG. 5 is a cross-sectional view of the embodiment shown in FIG. 4.
Figure 3:
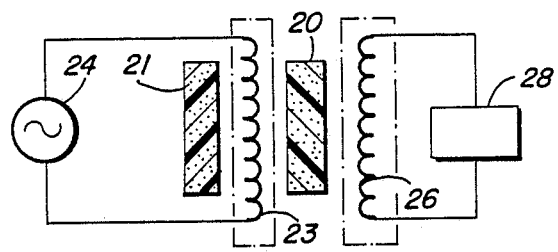
FIG. 3 is a modification of the embodiment shown in FIG. 1.

The transducer of FIGS. 1 and 2 can be utilized as a coupling device to provide the pulsating flux on the outer face of either of the plates 20 or 21 to generate signals in a pick-up coil which then may be utilized in any suitable utilization device. Such a device is shown in FIG. 3. A coil 26, which may be either a helical coil or a spiral coil similar to the coil 23, has the ends connected to the input terminals of a suitable alternating current utilization device or load 28. Signals produced by the source 24 are translated and amplified as variations in the magnetic field on the outer or right-hand face of the magnet 20. These variations induce current in the coil 26, and this current then is supplied to the device 28 for subsequent utilization.

FIGS. 4 through 7 illustrate the components of a structure which is suitable for operating a high fidelity speaker. A ceramic, circular, permanent magnet plate 30, which is made of magnetically hard ceramic material of the type described previously in conjunction with the plates 20 and 21, is utilized as the primary magnetic portion of the transducer. As with the embodiment shown in FIGS. 1 through 3, the magnet 30 has a thickness which is considerably less than the diameter of the parallel faces of the magnet. Mounted in the flux field of the left-hand face (the South Pole face) of the device shown in FIGS. 4 through 7 is a circular disk 31 of high permeability magnetic material (soft magnetic material). The center of the disk 31 has an integrally formed cylindrical extension 32 on its rear face. This is shown most clearly in FIGS. 4 and 5. An input coil 34 is wound around the cylindrical extension 32 and a suitable input signal source 36 is connected to the ends of the coil 34. The input signal typically is obtained from the output of an audio amplifier. Variations in the current through the coil 34 cause corresponding magnetic variations to be applied to the South Pole face (the left face as viewed in FIGS. 1 through 7) of the permanent magnet 30. This causes corresponding variations in the magnetic field to appear on the North Pole face of the permanent ceramic magnet 30.

Figure 6:
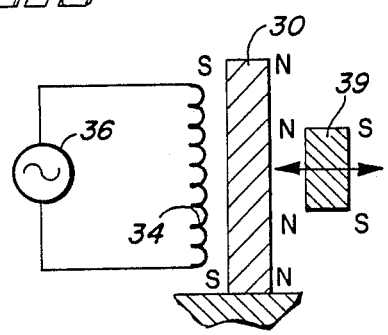
FIG. 6 is a diagrammatic representation of another embodiment of the invention.

As illustrated in FIG. 6, the magnet 30 may be anchored to a base. A small permanent magnet disk 39 then may be placed in the magnetic field of the magnet 30; so that as the field on the right-hand face of the magnet 30 varies, the repulsion (or if the poles of the magnet 39 are reversed, the attraction) between the magnets 30 and 39 varies in proportion to and at the rate of the variations in amount and rate of the field on the right-hand face of the magnet 30.

Figure 7:
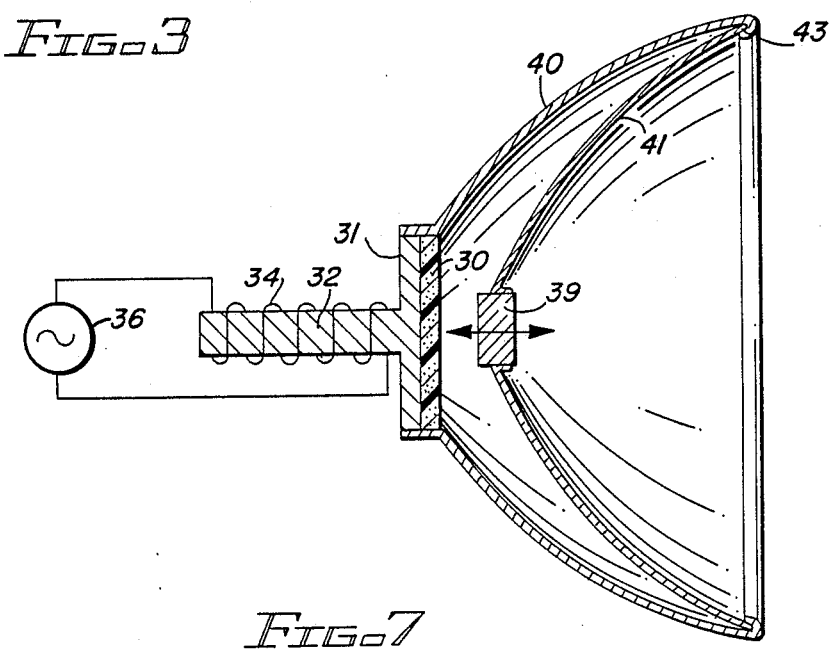
FIG. 7 is a cross-sectional view of a loudspeaker made in accordance with the provisions of the embodiment shown in FIG. 6.

This characteristic may be utilized in the construction of a high fidelity speaker as illustrated in FIG. 7. The non-moveable base or frame in which the magnet 30 is mounted comprises an outer speaker housing 40. The high permeability core 31 is bonded to the left-hand face of the ceramic magnet 30 at the back of the speaker housing. The permanent magnet 39 then is mounted at the apex of a flexible cone speaker 41, the outer edge of which is attached to the speaker housing 40 at the rim in a groove 43.

As illustrated by the arrows in FIG. 7, variations in the magnetic field at the face of the coil 30 cause corresponding variations in the repulsion force (or attraction force) of the permanent magnet 39. These variations are in synchronism with and in proportion to the magnitude of the signals applied to the coil 34 from the source 36. Consequently, a faithful reproduction, in the form of an audio signal, is produced by the movement of the magnet 39 corresponding to the electrical signals applied from the source 36 (audio amplifier) to the coil 34. This structure eliminates the necessity for connecting leads to a moving voice coil and results in a highly effective high fidelity speaker construction. The movement of the magnet 39 faithfully reproduces the signals applied to the coil 34 from the source 36.

Some advantages of the speaker of FIG. 7 are that the magnet 39 is never "loose" and free since the force field from the ceramic magnet 30 is always on. There always is an interaction between the fields of the magnets 30 and 39; and when no signals are applied from the source 36, the magnet 39 is held in a relatively stable position (its "neutral" position) with respect to the face of the magnet 30. The speaker driven by the magnet 39 is substantially free or damped from resonance and self-vibration when the signals from the source 36 stop. The stopping time is nearly instantaneous in contrast to the continued vibrations which take place with a conventional speaker using a voice coil when signals to the voice coil are terminated.

FIGS. 8, 9 and 10 illustrate another embodiment which is employed as a high frequency generator or "tweeter" speaker for high fidelity equipment. The same principles of operation, utilizing the variations in the intensity of the magnetic field on the large face of a thin flat ceramic permanent magnet plate are employed in this speaker. The speaker is simple in construction and consists of a circular flat metal disk 50 made of non-magnetic conductive material. Typical materials are aluminum foil or copper foil with a thickness of 1/64" to 1/10". The diameter typically is 3" to 4". A ceramic magnet 51, having a thickness of approximately ¼" and made of the same materials described above in conjunction with FIGS. 1 and 2, is placed behind the disk 50. The spacing between the disk 50 and the magnet 51 is established by a hollow circular plastic spacer ring 53 attached to the outer edges of the disk 50 and magnet 51 in any suitable manner, preferably by means of an epoxy bonding material. A spiral coil 54 is attached to the left-hand or South Pole face of the ceramic magnet 51.

Signals from an audio amplifier then are applied to the ends of the spiral coil 54. This produces a variation in the flux on the South Pole face of the disk 51 and this, in turn, as described previously, creates changes in the flux of the magnetic field on the North Pole face which is adjacent to (but spaced from) the metal disk 50. These variations in flux create corresponding variations in eddy currents in the metal disk 50. In response to these eddy current variations, the disk 50 vibrates at high frequencies (typical tweeter frequencies); and this vibration is translated into high quality, high fidelity sound. Consequently, the tweeter may be employed in high fidelity speakers; and it is readily apparent that very little depth is required for the installation of this tweeter. The thickness of the spacer ring 53 typically is on the order of ⅛" to ¼" and this ring may be made of any suitable non-conductive plastic material.

FIG. 11 illustrates a further application of the basic concepts of the devices which have been described previously in conjunction with FIGS. 1 through 10.

FIG. 11 shows a pair of flat ceramic magnets 60 and 61, formed in a circular shape and having a diameter of approximately 3" to 4" and a thickness of approximately ¼". The magnets 60 and 61 are made of magnetically hard dielectric ceramic material and are permanently magnetized through the thicknesses thereof in the manner described above in conjunction with FIGS. 1 and 2. A spiral coil 63 is placed on the left-hand or North Pole face of the magnet 60 and a similar spiral coil 64 is placed on the right hand or South Pole face of the magnet 61. The structure of the magnet 60 and coil 63 is identical to the structure of the magnet 61 and coil 64.

As is apparent from the descriptions of the foregoing embodiments, the application of an input signal to the terminals of the coil 63 causes a variation in the flux density on the right-hand or South Pole face of the magnet 60. The magnet 61 is located in close proximity to the magnet 60, so that the flux fields of the two magnets interact. Consequently, variations in the flux density appearing on the face of the magnet 60, as the result of signals in the coil 63, cause corresponding variations in flux density to appear on the South Pole face (right-hand face) of the magnet 61. These variations in flux density are such that the flux density increases and decreases in exact synchronism with the signal applied to the terminals of the coil 63. As a result, the changes in the flux density cause the generation of current in the coil 64, which produces an electrical duplicate of the changing flux coupled by the two magnets. Consequently, a signal applied to the input of the coil 63 is transferred to the coil 64 as a result of the changes in flux.

Figure 12:
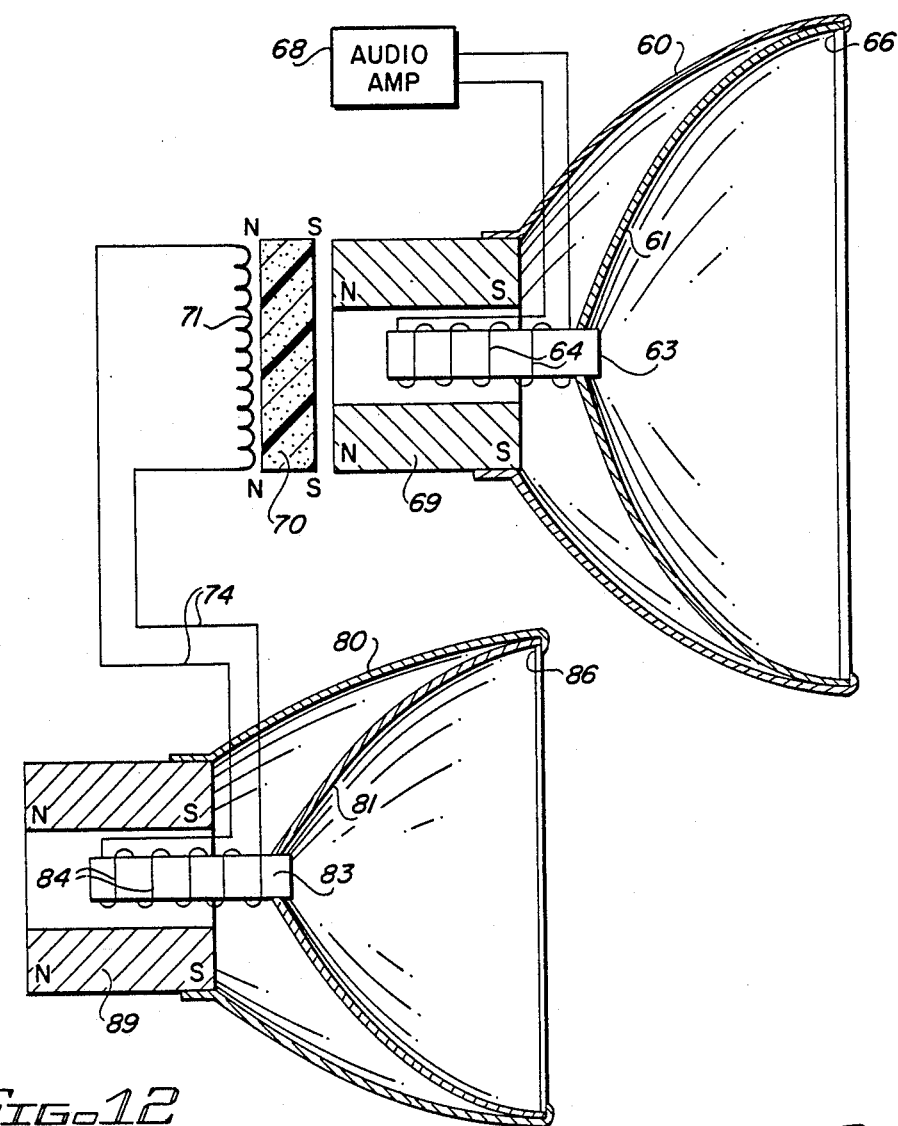
FIG. 12 is a cross-sectional view of an additional embodiment of the invention.

This principle may be used to permit one high fidelity speaker to be used to power a second or satellite speaker. Such an application is illustrated in FIG. 12. Reference should be made to FIG. 12 which illustrates a conventional high fidelity speaker having a housing 60 attached at its apex to a conventional donut or ring-shaped permanent magnet 69. A flexible speaker cone 61 is attached at its apex to a core 63 which has a voice coil 64 wound on it. The outer edge of the flexible speaker cone 61 is attached to the housing 60 in a groove 66 similar to the attachment described previously in conjunction with FIG. 7. Signals from an audio amplifier 68 then are applied to the end terminals of the voice coil 64 in a conventional manner. As is well known, the flux field produced around the voice coil 64 in response to these signals interacts with the permanent magnetic field through the core of the magnet 69 to cause an oscillating back and forth movement of the core 63 to drive the speaker 61 to produce sound. The speaker described thus far is a standard high fidelity speaker.

The speaker system of FIG. 12, however, is modified by attaching a thin circular ceramic magnet 70, made of hard magnetic materials of the type described previously, to the left-hand end of the permanent magnet 69. The magnet 70 may be bonded to the end of the magnet 69 or it may be spaced a short distance from the magnet 69. A coil 71, preferably a spiral coil, is attached to the right-hand face of the magnet 70; and the opposite ends of this coil are connected to the corresponding input ends of a voice coil 84 on a core 83 of a satellite speaker by means of a pair of leads 74. The satellite speaker comprises a housing 80 attached at its apex to a hollow cylindrical or donut-shaped permanent magnet 89. A flexible speaker cone 81 is attached at its apex to the core 83 of the voice coil 84, and the outer edge of the speaker cone 81 is attached in a ring 86 to the open end of the housing 80. The satellite speaker 80-89 is a conventional speaker, but the signals which drive this speaker are not obtained directly from the audio amplifier. Instead, these signals are generated in the coil 71 by the ceramic magnet 70 which produces signals of sufficient power to drive the second speaker. Consequently, one speaker may be used to power two.

Figure 13:
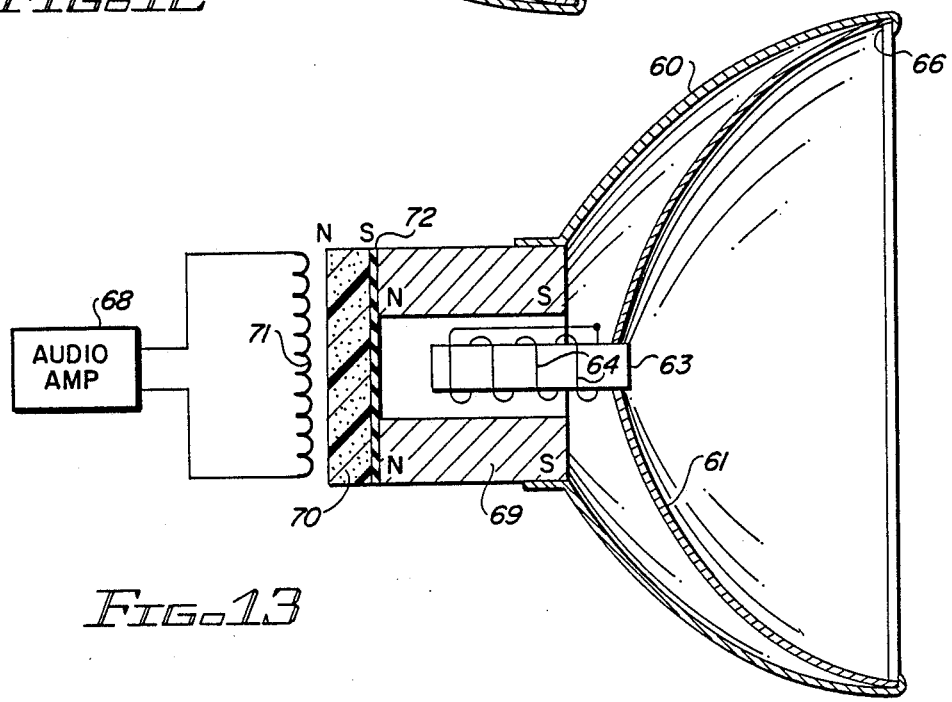
FIG. 13 is a cross-sectional view of another embodiment of a speaker in accordance with the invention.

FIG. 13 illustrates a further modification of a high fidelity speaker which eliminates the necessity for connecting electric wires or conductors to the moving voice coil. The speaker of FIG. 13 is similar in construction to the primary speaker of FIG. 12 except that the ends of the voice coil 64 are connected together to short circuit the voice coil. As illustrated in FIG. 13, the magnet 70 is bonded or attached to the end of the permanent magnet 69 by means of a suitable epoxy layer 72. Signals from the audio amplifier 68 then are applied to the terminals of the coils 71 instead of to the voice coils 64. The operation of the speaker of FIG. 13 is substantially identical to the operation of a standard high fidelity speaker where the signal is connected to the end terminals of the voice coil. The limitations created by connections to a moving voice coil, however, are eliminated since the coil to which the audio signals are applied, namely the coil 71, does not move, but is in a rigid position, attached to the left-hand face of the circular ceramic magnet 70. The voice coil 64 on its core 63 vibrates in response to variations in the changing magnetic field produced through the magnet 69 (in contrast to a standard high fidelity speaker where the flux field of the magnet 69 does not change). The magnetic field which is produced in the shorted voice coil is an analog of the sound input from the audio amplifier 68 and drives the speaker cone 61 to produce the desired output sounds.

Reference now should be made to FIGS. 14 and 15 which illustrate an improved large solenoid application. A relatively large non-conductive hollow cylindrical coil 100, typically having a height of 12" and an inside diameter of 22", has a coil 104 wrapped around its outer surface. The ends of the coil 104 are connected to a pulsed DC source 105. Devices of this type have been used in veterinary medicine, primarily in Europe to produce pulsing magnetic fields. The operation of such a device is significantly enhanced by providing an inner cylinder 102 of permanently magnetized magnetically hard ceramic magnetic material within the cylinder 100. Flexible material is used to form the inner magnetic cylinder 102, and the cylinder 102 is magnetized through its thickness (or radially) to cause the outer surface to have one magnetic pole and the inner surface to have a second opposite magnetic pole. The principles of the magnetic flux density multiplication occur in conjunction with the device of FIGS. 14 and 15, and its operation is enhanced as a result.

The foregoing description, taken in conjunction with the various figures of the drawings, is to be considered illustrative of the different embodiments of the invention and not as limiting. Various changes and modifications will occur to those skilled in the art, once the enhanced operating characteristics of the electromagnetic transducers are fully understood. A number of different system applications have been described, but the invention is applicable over a wide range of electromagnetic transducers, such as hearing aids, earphones, microphones, guitar pick-ups and the like. Utilization of the invention in such products and others will occur to those skilled in the art without departing from the true scope of the invention. The relative dimensions of various components which have been described, also may be varied without departing from the invention.

I claim:

1. An electromagnetic transducer including in combination:
   first and second closely spaced flat ceramic magnetic plates of permanently magnetized material, said plates each having a thickness substantially less than the length and width thereof, with first and second faces thereon and magnetized through the thicknesses thereof to form a North Pole on the first face thereof and to form a South Pole on the second face thereof; and
   a coil of electrically conductive material immovably sandwiched between said magnetic plates and located in the magnetic field between said first face of said first plate and said second face of said second plate for inducing changes in the magnetic field adjacent said second face of said first plate and said first face of said second plate when current is applied through said coil, changes in the magnetic field at said second face of said first plate and said first face of said second plate being proportional to such current.

2. The combination according to claim 1 wherein said first and second plates are made of magnetically hard material.

3. The combination according to claim 2 wherein said first and second plates are made of magnetically hard dielectric material.

4. The combination according to claim 3 wherein said coil is a spiral coil, the plane of which is parallel to the planes of the faces of said plates.

5. The combination according to claim 4 wherein said coil is attached to said first face of said first plate.

6. The combination according to claim 1 wherein said coil is a spiral coil, the plane of which is parallel to the planes of the faces of said plates.

7. The combination according to claim 6 wherein said coil is attached to said first face of said first plate.

8. The combination according to claim 1 wherein said coil is attached to said first face of said first plate.

9. An electromagnetic transducer including in combination:
   a flat ceramic magnetic plate of permanently magnetized material, said plate having a thickness substantially less than the length or width thereof, with first and second faces thereon and magnetized through the thickness thereof to form a North Pole on the first face thereof and to form a South Pole on the second face thereof; and
   a coil of electrically conductive material immovably attached to one of said first and second faces of said plate for producing current flow therein proportional to changes induced in the magnetic field at said one face of said plate and for inducing changes in the magnetic field adjacent said first and second faces of said plate when current is applied through said coil.

10. The combination according to claim 9 wherein said plate is made of magnetically hard material.

11. The combination according to claim 9 wherein said coil is a spiral coil, the plane of which is parallel to said one face of said plate.

12. The combination according to claim 11 wherein said coil is attached to said first face of said plate.

* * * * *